(12) United States Patent
Kellerman et al.

(10) Patent No.: US 9,209,609 B2
(45) Date of Patent: Dec. 8, 2015

(54) CABLE TRAY SYSTEM WITH SPLICE PLATE

(71) Applicant: Cablofil, Inc., Mascoutah, IL (US)

(72) Inventors: Dallas Kellerman, Belleville, IL (US); Phillip Torre, Lebanon (IL)

(73) Assignee: CABLOFIL INC., Mascoutah, IL (US)

( * ) Notice: Subject to any disclaimer, the term of this patent is extended or adjusted under 35 U.S.C. 154(b) by 0 days.

(21) Appl. No.: 14/315,977

(22) Filed: Jun. 26, 2014

(65) Prior Publication Data

US 2015/0001352 A1    Jan. 1, 2015

Related U.S. Application Data

(60) Provisional application No. 61/839,696, filed on Jun. 26, 2013.

(51) Int. Cl.
*F16L 3/00* (2006.01)
*H02G 3/06* (2006.01)
*E04B 1/58* (2006.01)
*F16L 3/23* (2006.01)
*F16L 3/22* (2006.01)

(52) U.S. Cl.
CPC ............ *H02G 3/0608* (2013.01); *E04B 1/5812* (2013.01); *F16L 3/221* (2013.01); *F16L 3/23* (2013.01)

(58) Field of Classification Search
CPC ............... F16L 3/00; F16L 3/221; F16L 3/23; H02G 3/0608; E04B 1/5812; Y10T 403/75; Y10T 403/5741
USPC ......... 248/49, 57, 58, 65, 300, 68.1; 403/306, 403/308, 376, 408.1; 52/713, 715, 848; 174/68.3, 68.1
See application file for complete search history.

(56) References Cited

U.S. PATENT DOCUMENTS

| | | | | |
|---|---|---|---|---|
| 3,448,955 A | * | 6/1969 | Fussell | 248/58 |
| 3,521,843 A | * | 7/1970 | Ogle | 248/58 |
| 3,602,373 A | | 8/1971 | Cassel | |
| 4,069,638 A | | 1/1978 | Hasselqvist et al. | |
| 4,232,845 A | | 11/1980 | Turner | |
| 4,322,845 A | * | 3/1982 | Fennel et al. | 370/321 |
| 4,733,986 A | * | 3/1988 | Kenning et al. | 403/306 |
| 4,802,643 A | | 2/1989 | Uys | |

(Continued)

FOREIGN PATENT DOCUMENTS

| | | |
|---|---|---|
| AU | 2005209610 B2 | 3/2007 |
| GB | 2114820 A | 8/1983 |

(Continued)

*Primary Examiner* — Tan Le
(74) *Attorney, Agent, or Firm* — Bryan Cave LLP

(57) ABSTRACT

A cable tray system including cable trays formed of a first side rail and a second side rail arranged substantially parallel to one another and transverse rungs extending between and connecting the first and second side rails. The first and second side rails each include a vertical web, a portion of which is inwardly protruding. The cable tray system further includes a splice plate for splicing or joining multiple cable trays. The splice plate includes a vertical web, a portion of which is inwardly protruding, wherein the inwardly protruding portion of the splice plate cooperates with the inwardly protruding portion of the first and second side rails. Holes in the first and second side rails can be aligned with holes in the splice plate through which fasteners may be inserted through to secure the splice plate to the side rails.

13 Claims, 6 Drawing Sheets

(56) References Cited

U.S. PATENT DOCUMENTS

| | | |
|---|---|---|
| 5,359,143 A | 10/1994 | Simon |
| 5,465,929 A | 11/1995 | Dooley |
| 5,547,307 A | 8/1996 | Decore et al. |
| 5,580,014 A | 12/1996 | Rinderer |
| 5,639,048 A * | 6/1997 | Bartholomew et al. ......... 248/49 |
| 6,313,405 B1 | 11/2001 | Rinderer |
| 6,402,418 B1 | 6/2002 | Durin et al. |
| 6,498,296 B2 | 12/2002 | Benito-Navazo |
| 7,114,789 B2 | 10/2006 | Keaton |
| 7,407,138 B1 | 8/2008 | Gretz |
| 7,608,786 B2 | 10/2009 | Deciry et al. |
| 7,903,924 B2 | 3/2011 | Pollard, Jr. et al. |
| 7,922,012 B2 | 4/2011 | Sisley |
| 8,136,769 B2 | 3/2012 | Cardin |
| 8,459,604 B2 * | 6/2013 | Smith et al. ................... 248/300 |
| 2010/0044524 A1* | 2/2010 | Sugaya et al. ................... 248/49 |
| 2010/0086348 A1 | 4/2010 | Funahashi et al. |
| 2012/0312761 A1 | 12/2012 | White |

FOREIGN PATENT DOCUMENTS

| | | |
|---|---|---|
| JP | 53 044298 A | 4/1978 |
| JP | 2001292517 A | 10/2001 |
| JP | 2002112425 A | 4/2002 |
| JP | 2003299222 A | 10/2003 |

* cited by examiner

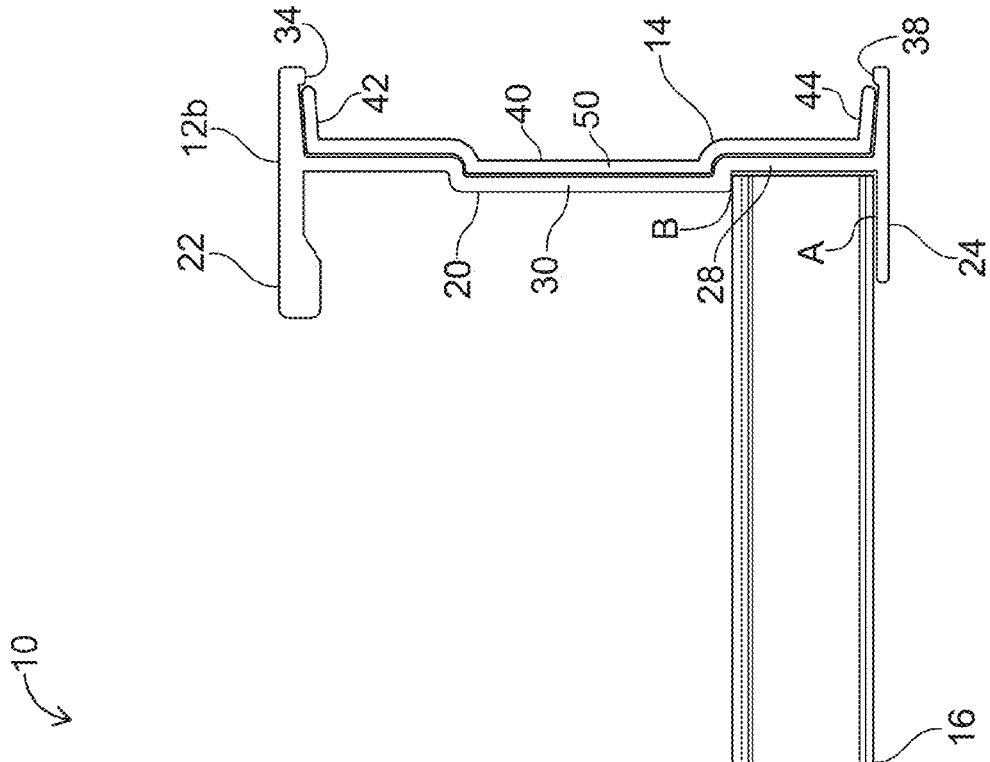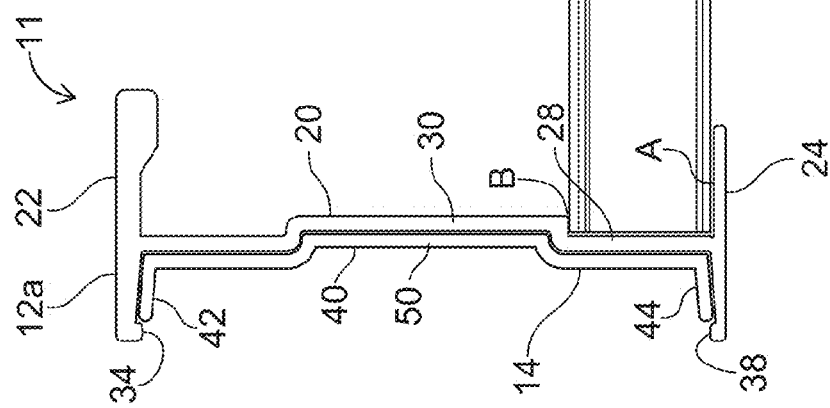
FIG. 3

CABLE TRAY SYSTEM WITH SPLICE PLATE

BACKGROUND

The present disclosure relates to cable tray systems for use with electrical and other cable and wiring systems.

Cable trays are used to support cables, electrical wires and the like which run through, over, and around buildings. Cable trays may have both straight and curved (horizontal and/or vertical) sections to accommodate the installation requirements of particular settings.

SUMMARY OF THE DISCLOSURE

Briefly, therefore, one aspect of the disclosure is directed to a splice plate for joining side rails of cable trays comprising a vertical web extending a length, L, and having an upper edge and a lower edge. The vertical web comprises a protruded vertical web portion protruding from the vertical web in a first direction substantially perpendicular to the length of the vertical web. An upper flange extends from the upper edge of the vertical web and a lower flange extends from the lower edge of the vertical web, wherein the upper and lower flanges extend in a second direction substantially opposite from the first direction. The splice plate further includes a population of holes extending through the vertical web through which a population of fasteners may be inserted to secure the splice plate to a side rail of a cable tray.

Another aspect of the disclosure is directed to a splice plate for joining side rails of cable trays comprising a vertical web extending a length, L, and having an upper edge and a lower edge. The vertical web comprises a protruded vertical web portion protruding from the vertical web in a first direction substantially perpendicular to the length of the vertical web. An upper flange extends from the upper edge of the vertical web and a lower flange extends from the lower edge of the vertical web, wherein the upper and lower flanges extend in a second direction substantially opposite from the first direction. The splice plate further includes a population of elongated holes extending through the vertical web which permit expansion and contraction of side rails of a cable tray system without buckling, warping or deforming.

Another aspect of the disclosure is directed to a cable tray system comprising a population of cable trays joined by a population of splice plates. The cable trays comprise a first side rail and a second side rail arranged substantially parallel to one another and a population of transverse rungs extending between and connecting the first and second side rails. The first and second side rails comprise a side rail vertical web extending a length from a first end to a second end, the side rail vertical web having an upper edge and a lower edge. A side rail protruded vertical web portion protrudes from the side rail vertical web in a first direction substantially perpendicular to the length of the side rail vertical web. Holes extend through the side rail, wherein one or more of the holes are located proximate the first and second ends of the side rail vertical web. The splice plates for joining the population of cable trays comprise a splice plate vertical web extending a length, L, and having an upper edge and a lower edge. A splice plate protruded vertical web portion protrudes from the splice plate vertical web in the first direction and the splice plate protruded vertical web portion is adapted to cooperate with the side rail protruded vertical web portion. An upper flange extends from the upper edge of the splice plate vertical web and a lower flange extends from the lower edge of the splice plate vertical web, wherein the upper and lower flanges extend in a second direction substantially opposite from the first direction. Holes extend through the splice plate which are adapted to be aligned with the holes extending through the side rail. Fasteners may be inserted through holes in the splice plate and the side rail secure the splice plate to the side rails of a population of cable trays.

BRIEF DESCRIPTION OF THE FIGURES

These and other features, aspects and advantages of the disclosure will become more fully apparent from the following detailed description, appended claims, and accompanying drawings, wherein the drawings illustrate features in accordance with exemplary aspects of the disclosure, and wherein:

FIG. 3 is a front view of the cable tray system according to one aspect of the disclosure;

FIG. 4A is a left side view of the splice plate according to the aspect of the disclosure shown in FIG. 3;

DETAILED DESCRIPTION

Before any aspects of the disclosure are explained in detail, it will be understood that the disclosure is not limited in its application to the details of construction and the arrangement of components set forth in the following description or illustrated in the following drawings. The disclosure is capable of other aspects and of being practiced or of being carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. All numbers expressing measurements and so forth used in the specification and claims are to be understood as being modified in all instances by the term "about."

Figure 1:
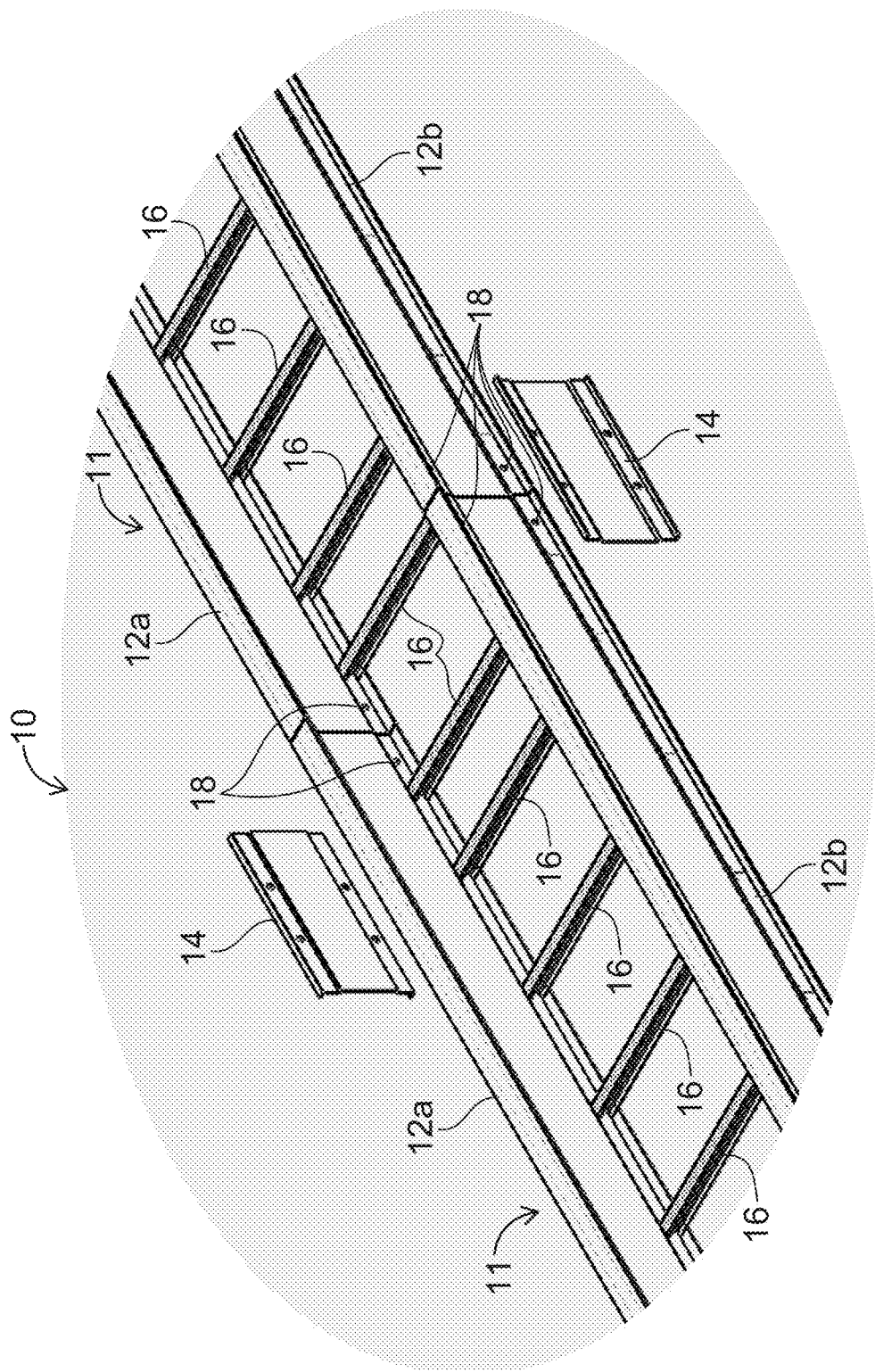
FIG. 1 is a right side perspective view of a cable tray system according to one aspect of the disclosure.

As shown in FIG. 1, cable tray system 10 includes a population of cable trays 11 joined together using a population of splice plates 14. Each cable tray 11 includes first and second side rails 12a, 12b arranged substantially parallel to one another. A population of transverse rungs 16 extends between first and second side rails 12a, 12b. The population of transverse rungs 16 are spaced at predetermined intervals along the length of first and second side rails 12a, 12b, forming a ladder-like structure. Cable and electrical wire placed in the cable tray system 10 typically rests on the population of transverse rungs 16. The top of rungs 16 may curve downward to reduce or eliminate snagging or damage to the cable or electrical wire placed in the cable tray system 10. Multiple cable trays 11 may be joined or spliced together using multiple splice plates 14. A splice plate 14 is used to join two first side rails 12a and another splice plate is used to join two second side rails 12b of two cable trays 11. Accordingly, multiple cable trays 11 may be joined together using multiple splice plates 14.

Figure 2:
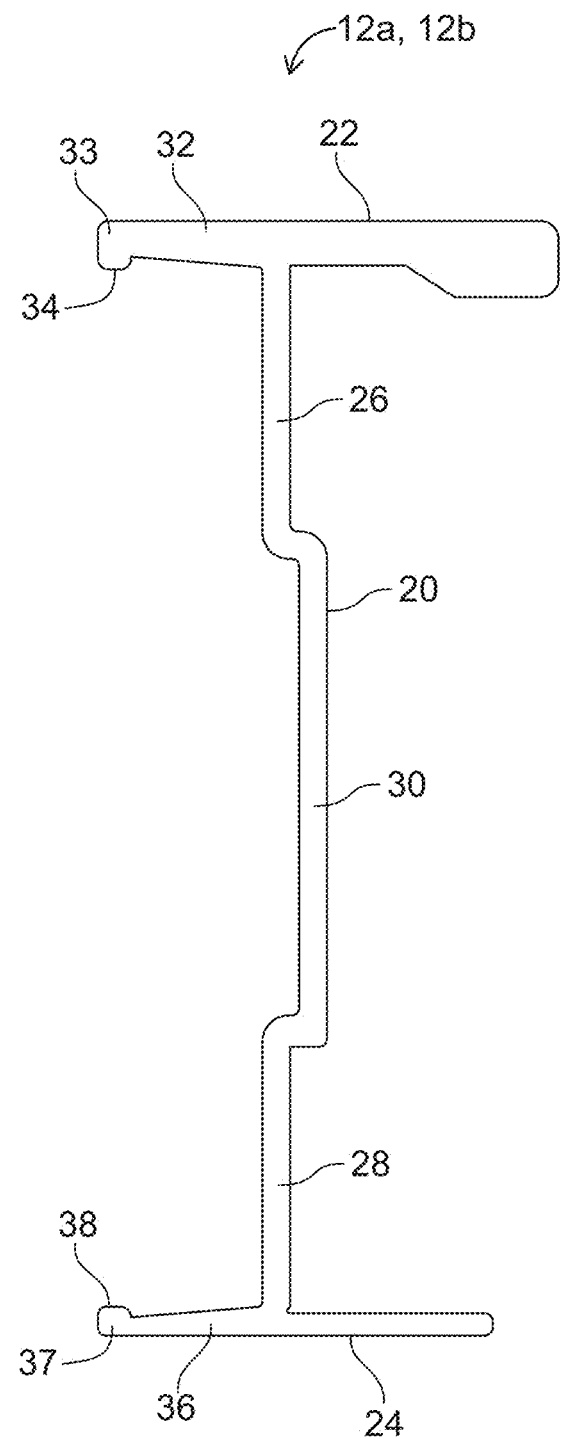
FIG. 2 is front view of a side rail according to one aspect of the disclosure.

As illustrated in FIG. 2, each of first and second side rails 12a, 12b are substantially I-shaped in cross section. Accordingly, first and second side rails 12a, 12b have a vertical web 20 extending a length from a first end to a second end. Upper and lower horizontal flanges 22, 24 extend laterally in opposite directions from upper and lower edges of vertical web 20, respectively. A portion of vertical web 20 is inwardly protruding along a first direction perpendicular to the length of side rails 12a, 12b. That is, when cable tray 11 is assembled, the inwardly protruding portions of side rails 12a, 12b protrude toward the center of cable tray 11. Stated alternatively, when cable tray 11 is assembled, the inwardly protruding portion of first side rail 12a protrudes toward the inwardly protruding portion of second side rail 12b, and vice versa. Accordingly, vertical web 20 includes an upper vertical web portion 26, a lower vertical web portion 28, and an inwardly protruding web portion 30. In certain aspects, inwardly protruding web portion 30 may be substantially centrally located in vertical web 20. Accordingly, upper and lower vertical web portions 26, 28 may have substantially equal vertical heights.

Additionally, upper horizontal flange 22 includes an outboard flange portion 32 having a downwardly extending lip 34 located on the terminal edge 33 of outboard flange portion 32. Lower horizontal flange 24 may also include an outboard flange portion 36 having an upwardly extending lip 38 located on the terminal edge 37 of outboard flange portion 36. As described elsewhere more fully herein, lips 34, 38 may assist in retaining splice plate 14 on side rails 12a, 12b. It will be understood by one skilled in the art that, in certain aspects only upper horizontal flange 22 includes lip 34, in other aspects only lower horizontal flange 24 includes lip 38, and in yet other aspects neither upper horizontal flange 22 nor lower horizontal flange 24 include lips 34, 38.

As shown in FIG. 3, the height of lower vertical web portion 28 may be substantially equal to the height of rung 16 to provide a tight or snug fit of an end of a rung 16 between inwardly protruding web portion 30 and lower horizontal flange 24. Rungs 16 may be tack welded to first and second side rails 12a, 12b on one or more sides of rungs 16 at location A. Additionally, rungs 16 may be welded to first and second side rails 12a, 12b at location B. In other aspects, for example, rungs 16 may be mechanically fastened to first and second side rails 12a, 12b in a variety of ways including, but not limited to, screws, bolts, rivets, etc. instead of or in addition to welding.

With reference again to FIG. 1, side rails 12a, 12b further include a population of holes 18 through upper and lower web portions 26, 28 proximate the first and second ends of side rails 12a, 12b. As shown, side rail 12a includes one hole 18 through each of upper and lower web portion 26, 28 proximate the first and second ends of side rail 12a. Additionally, side rail 12b includes one hole 18 through each of upper and lower web portion 26, 28 proximate the terminal end of side rail 12b. In other aspects, for example, holes 18 may be in any location of side rail 12a, 12b including upper web portion 26, lower web portion 28, inwardly protruding web portion 30, upper horizontal flange 22, and/or lower horizontal flange 24. It will be understood that in other aspects, for example, first and second side rails 12a, 12b may include a population of holes 18 comprising fewer or greater than four holes 18.

The first and second side rails 12a, 12b and the transverse rungs 16 are preferably constructed of aluminum or an alloy thereof; however, it will be understood that any type of suitable material may be used, including, but not limited to, steel, stainless steel, or alloys thereof. First and second side rails 12a, 12b and transverse rungs 16 may be formed by extruding, casting, bending, or any other type of forming known in the art.

Figure 4:
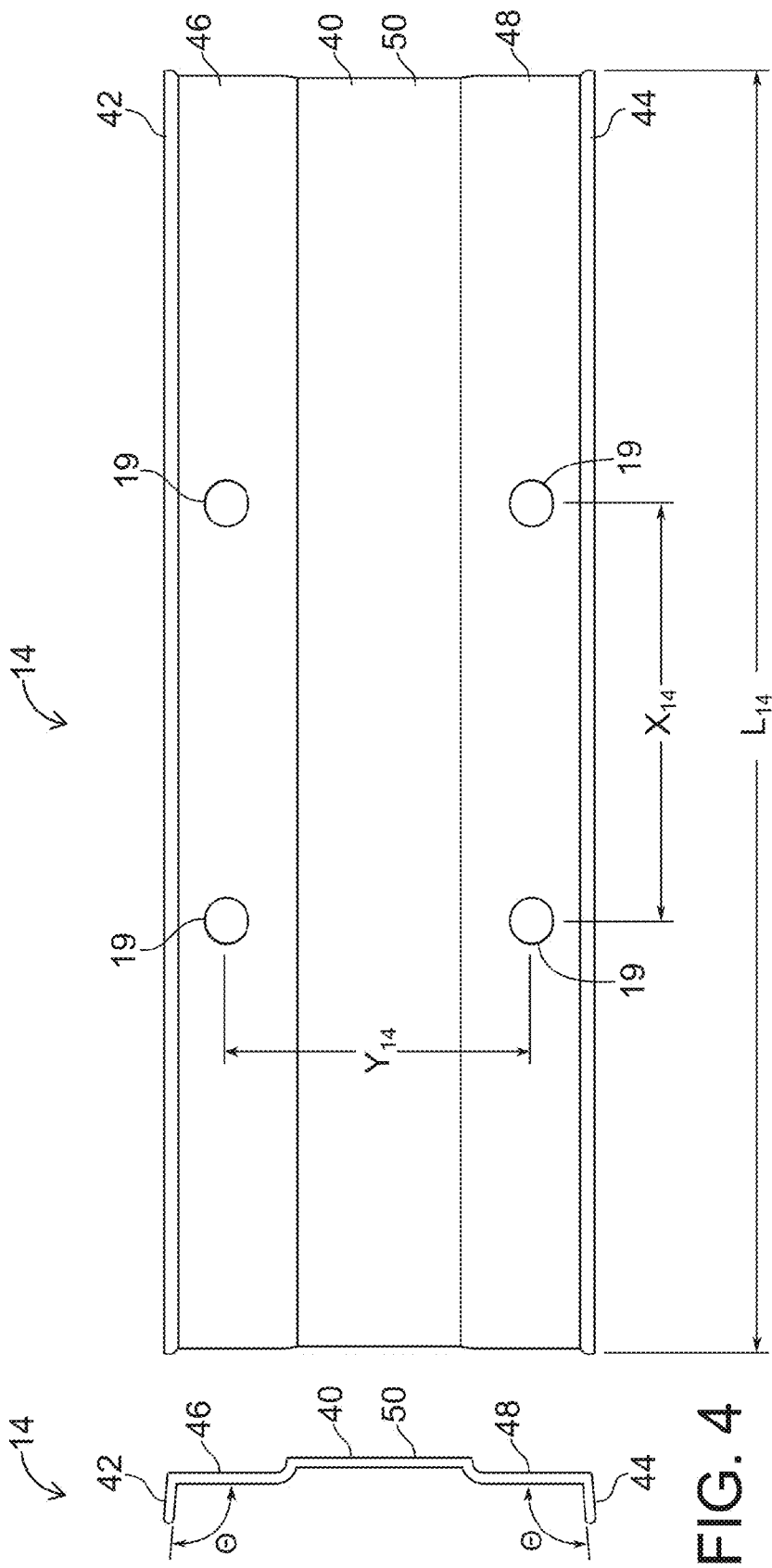
FIG. 4 is a front view of a splice plate according to one aspect of the disclosure.

Referring now to FIGS. 3, 4, and 4A, an aspect of splice plate 14 is shown. Splice plate 14 includes vertical web 40 extending a length, $L_{14}$, a portion of which protrudes in a first direction substantially perpendicular to the length, $L_{14}$, of vertical web 40. When joined to first and second side rails 12a, 12b, the portion of vertical web 40 protruding in the first direction is inwardly protruding. That is, when splice plate 14 is used to join cable trays 11, the inwardly protruding portions of splice plate 14 protrude toward the center of cable tray 11. Stated alternatively, when splice plates 14 are used to join cable trays 11, the inwardly protruding portion of a first splice plate 14 joined to a first side rail 12a protrudes toward the inwardly protruding portion of a second splice plate 14 joined to a second side rail 12b, and vice versa. Accordingly, vertical web 40 includes an upper vertical web portion 46, a lower vertical web portion 48, and an inwardly protruding web portion 50. In certain aspects, inwardly protruding web portion 50 may be substantially centrally located in vertical web 40. Accordingly, upper and lower vertical web portions 46, 48 may have substantially equal vertical heights. Inwardly protruding web portion 50 of splice plate 14 is dimensioned such that it can cooperate or mate with inwardly protruding web portion 30 of side rails 12a, 12b.

Splice plate 14 further includes upper and lower flanges 42, 44 outwardly extending from upper and lower edges of vertical web 40, respectively. That is, upper and lower flanges 42, 44 extend substantially in a second direction opposite from the first direction of inwardly protruding web portion 50. As shown in FIGS. 3 and 4, upper and lower flanges 42, 44 may flare slightly upward and downward, respectively, such that upper and lower flanges 42, 44 are not perpendicular to vertical web 40. In other aspects, for example, upper and/or lower flanges 42, 44 of splice plate 14 may be substantially horizontal (i.e., substantially perpendicular to vertical web portion 40 of splice plate 14). Therefore, in various aspects for example, upper and lower flanges 42, 44 may be disposed at an angle θ with respect to vertical web 40 wherein θ may range from about 80 degrees to about 120 degrees (e.g., about 80 degrees, about 85 degrees, about 90 degrees, about 95 degrees, about 100 degrees, about 105 degrees, about 110 degrees, about 115 degrees, about 120 degrees). In certain aspects, angle θ may be from about 90 degrees to about 105 degrees. Preferably, angle θ is about 95 degrees.

Figure 5:
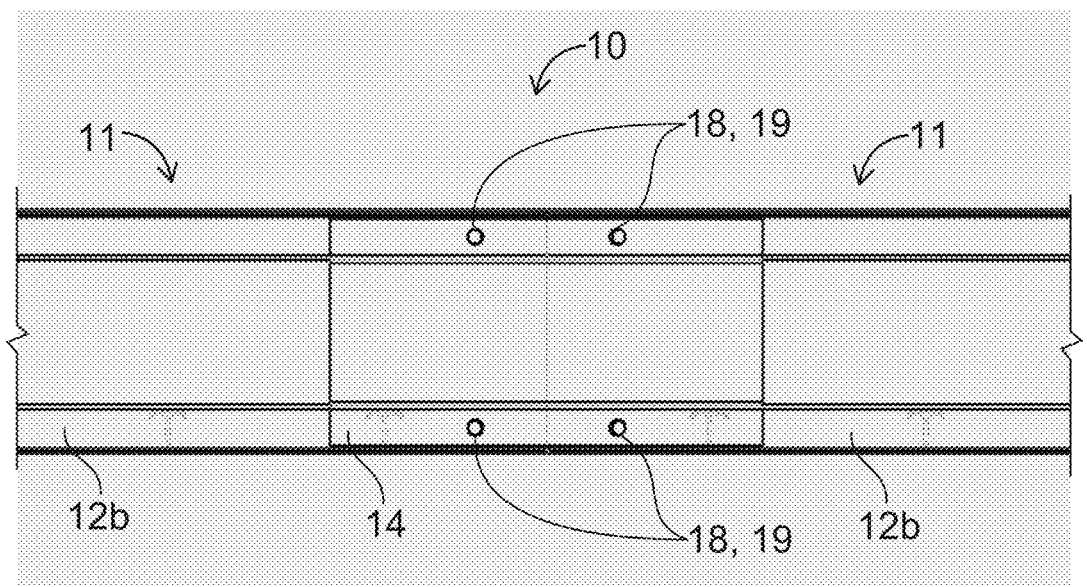
FIG. 5 is a right side view of a cable tray system joined together using the splice plate according to the aspect of the disclosure shown in FIGS. 4 and 4A.

Accordingly, as shown in FIG. 3, when splice plate 14 is mated to side rails 12a, 12b, upper and lower flanges 22, 24 of side rails 12a, 12b may come into contact with upper and lower flanges 42, 44 of splice plate 14. This contact between upper and lower flanges 22, 24 of side rails 12a, 12b and upper and lower flanges 42, 44 of splice plate 14 may cause upper and lower flanges 42, 44 of splice plate 14 to flex downward and upward, respectively. This flexure may assist in retaining splice plate 14 in position against side rails 12a, 12b. Furthermore, as illustrated in FIG. 5, this contact and/or flexure may assist in keeping multiple cable trays 11 in parallel alignment. That is, the length and cross-sectional shape of splice plate 14 assist in preventing first side rails 12a, 12a from sagging at the joint location. Additionally, as shown in FIG. 3, lips 34, 38 of upper and lower flanges 22, 24 of side rails 12a, 12b may serve as a snapping or locking mechanism for holding or securing splice plate 14 to side rails 12a, 12b. Lips 34, 38 may contact upper and lower flanges 42, 44 of splice plate 14 and prevent splice plate 14 from moving outwardly.

With reference again to FIG. 4A, splice plate 14 has a length $L_{14}$. In various aspects, for example, length $L_{14}$ may be from about 4 inches to about 24 inches (e.g., about 4 inches, about 5 inches, about 6 inches, about 7 inches, about 8 inches, about 9 inches, about 10 inches, about 11 inches, about 12 inches, about 13 inches, about 14 inches, about 15 inches, about 16 inches, about 17 inches, about 18 inches, about 19 inches, about 20 inches, about 21 inches, about 22 inches, about 23 inches, about 24 inches). Preferably, in certain aspects, for example, splice plate 14 has a length $L_{14}$ of about 12 inches.

Typically, splice plate 14 includes four holes 19 through upper and lower web portions 46, 48 in locations corresponding to holes 18 of side rails 12a, 12b. It will be understood that in other aspects, for example, splice plate 14 may include a population of holes 19 comprising fewer or greater than four holes 19. In other aspects, for example, holes 19 may be in any location of splice plate 14 including upper web portion 46, lower web portion 48, inwardly protruding web portion 50, upper flange 42, and/or lower flange 44. Thus, as shown in FIG. 5, when splice plate 14 is used to join two cable trays 11, the four holes 19 of splice plate 14 are aligned with two holes 18 in a first side rail 12a and two holes 18 in a second side rail 12a, wherein the ends of the side rails 12a, 12a are placed proximate one another. A fastener (not shown) is then inserted through holes 18, 19 of side rails 12a, 12a and splice plate 19 to secure splice plate 14 to side rails 12a, 12a. The same is done for two side rails 12b. Accordingly, splice plate 14 may be secured to side rails 12a, 12a using a variety of fasteners including, but not limited to, screws, bolts, rivets, etc.

Furthermore, holes 19 of splice plate 14 are typically separated by a horizontal distance $X_{14}$ and a vertical distance $Y_{14}$. In various aspects, for example, horizontal distance $X_{14}$ may be from about 2 inches to about 8 inches (e.g., about 2 inches, about 2.25 inches, about 2.5 inches, about 2.75 inches, about 3 inches, about 3.25 inches, about 3.5 inches, about 3.75 inches, about 4 inches, about 4.25 inches, about 4.5 inches, about 4.75 inches, about 5 inches, about 5.25 inches, about 5.5 inches, about 5.75 inches, about 6 inches, about 6.25 inches, about 6.5 inches, about 6.75 inches, about 7 inches, about 7.25 inches, about 7.5 inches, about 7.75 inches, about 8 inches). Preferably, in certain aspects, for example, horizontal distance $X_{14}$ is about 4 inches. In various aspects, for example, vertical distance $Y_{14}$ may be from about 2 inches to about 8 inches (e.g., about 2 inches, about 2.25 inches, about 2.5 inches, about 2.75 inches, about 3 inches, about 3.25 inches, about 3.5 inches, about 3.75 inches, about 4 inches, about 4.25 inches, about 4.5 inches, about 4.75 inches, about 5 inches, about 5.25 inches, about 5.5 inches, about 5.75 inches, about 6 inches, about 6.25 inches, about 6.5 inches, about 6.75 inches, about 7 inches, about 7.25 inches, about 7.5 inches, about 7.75 inches, about 8 inches). Preferably, in certain aspects, for example, vertical distance $Y_{14}$ is about 2.75 inches. In other aspects, for example, vertical distance $Y_{14}$ is about 2.8125 inches.

Splice plate 14 is preferably constructed of aluminum or an alloy thereof; however, it will be understood that any type of suitable material may be used, including, but not limited to, steel, stainless steel, or alloys thereof. Splice plate 14 may be formed by extruding, casting, bending, or any other type of forming known in the art.

Figure 6A:
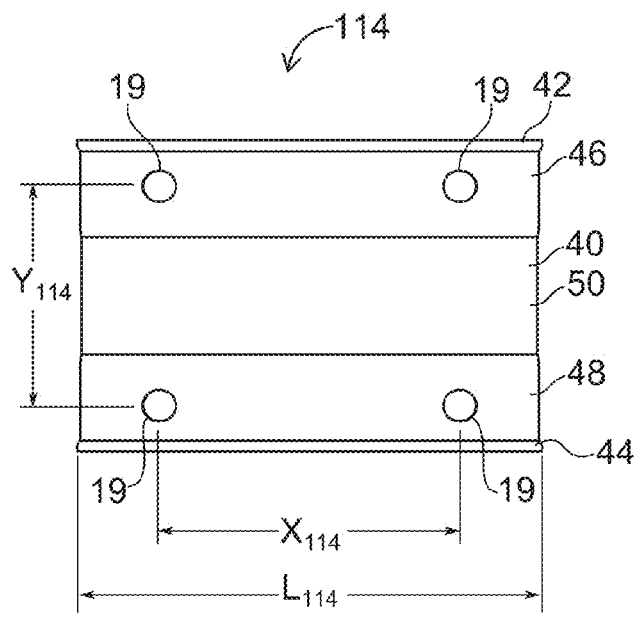
FIG. 6A is a left side view of a splice plate according to another aspect of the disclosure.

Referring now to FIG. 6A, an alternative aspect of a splice plate 114 is described in detail. Additionally, splice plate 114 may be substantially similar to splice plate 14. That is, splice plate 114 includes vertical web 40 having an upper vertical web portion 46, a lower vertical web portion 48, and an inwardly protruding web portion 50. As with splice plate 14, inwardly protruding web portion 50 of splice plate 114 is dimensioned such that it can cooperate or mate with inwardly protruding web portion 30 of side rails 12a, 12b. Furthermore, splice plate 114 includes upper and lower flanges 42, 44 outwardly extending from upper and lower edges of vertical web portion 40, respectively. Additionally, the locations of holes 19 in splice plate 114 are substantially similar or identical to the locations of holes 19 in splice plate 14. The length $L_{114}$ of splice plate 114, however, may be shorter than length $L_{14}$ of splice plate 14. In various aspects, for example, length $L_{114}$ may be from about 2 inches to about 8 inches (e.g., about 2 inches, about 3 inches, about 4 inches, about 5 inches, about 6 inches, about 7 inches, about 8 inches, about 9 inches, about 10 inches). Preferably, in certain aspects, for example, splice plate 114 has a length $L_{114}$ of about 6 inches. The shorter length $L_{114}$ of splice plate 114 allows it to be used to join curved or angled side rails with straight side rails 12a, 12b or to other curved or angled side rails. The side rails, whether curved, angled or straight, typically have about a 3 inch straight section beyond holes 18 before the side rail begins to curve or angle. Accordingly, shorter splice plate 114 is used. Typically, the horizontal and vertical distances $X_{114}$ and $Y_{114}$ of holes 19 of splice plate 114 are substantially similar or identical to horizontal and vertical distances $X_{14}$ and $Y_{14}$ of holes 19 of splice plate 14.

Figure 6B:
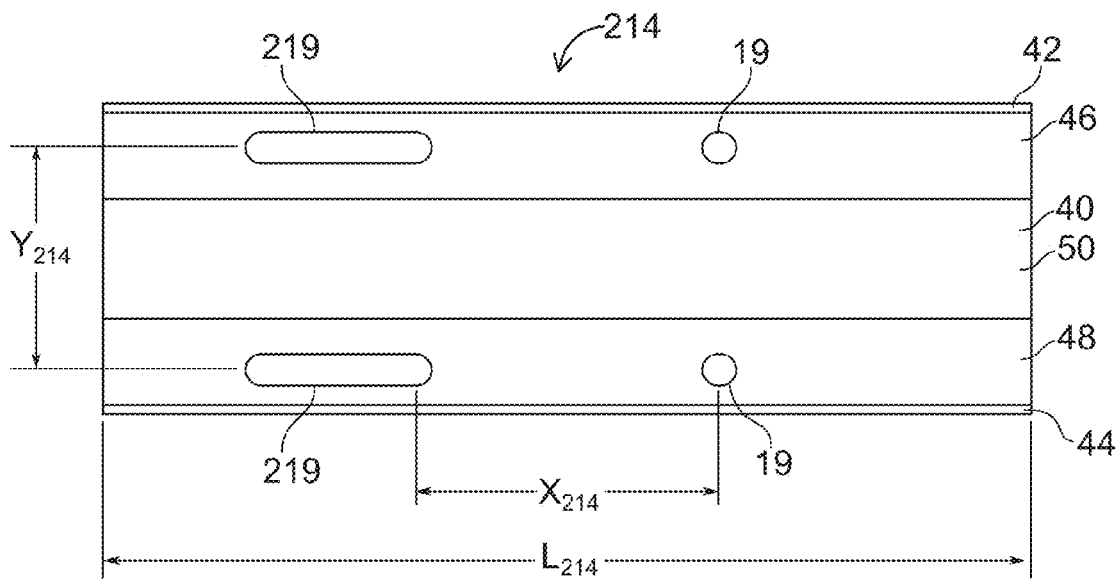
FIG. 6B is a left side view of a splice plate according to yet another aspect of the disclosure.

Referring now to FIG. 6B, an alternative aspect of a splice plate 214 is described in detail. Additionally, splice plate 214 may be substantially similar to splice plate 14. That is, splice plate 214 includes vertical web 40 having an upper vertical web portion 46, a lower vertical web portion 48, and an inwardly protruding web portion 50. As with splice plate 14, inwardly protruding web portion 50 of splice plate 214 is dimensioned such that it can cooperate or mate with inwardly protruding web portion 30 of side rails 12a, 12b. Furthermore, splice plate 214 includes upper and lower flanges 42, 44 outwardly extending from upper and lower edges of vertical web portion 40, respectively. The length $L_{214}$ of splice plate 114 may be substantially similar or identical to length $L_{14}$ of splice plate 14.

Figure 7:
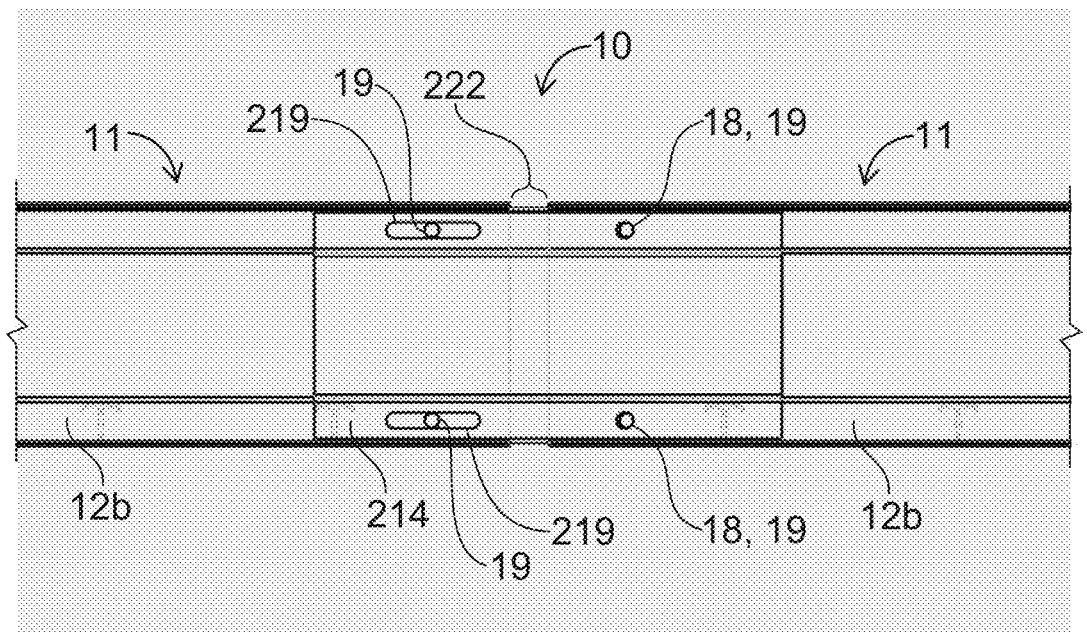
FIG. 7 is a right side view of the cable tray system joined together using the splice plate according to the aspect of the disclosure shown in FIG. 6B.

Splice plate 214 differs from splice plates 14 and 114 in that splice plate 214 includes two elongated holes 219 in place of two holes 19. It will be understood that in other aspects, for example, splice plate 214 may include fewer or greater than two elongated holes 219 and fewer or greater than holes 19. As shown in FIG. 4B, elongated holes 219 are obround in shape; however in other aspects, elongated holes may be in a variety of shapes including, but not limited to, rectangular, oblong, ovular, etc. Elongated holes 219 permit the inclusion of gaps 222 between cable trays 11 as shown in FIG. 7. As stated previously, the components of cable tray system 10 (e.g., side rails 12a, 12b, rungs 16, splice plates 14, 114, 214) are typically constructed of aluminum which can expand and contract with large changes in temperature. Therefore to reduce or eliminate buckling, warping and/or deformation of an installation of a cable tray system 10, splice plates 214 are used to join first and second side rails 12a, 12b at different locations along the installation of the cable tray system 10. The elongated holes 219 and the inclusion of gaps 222 between ends of side rails 12a, 12b permit expansion or contraction of side rails 12a, 12b without buckling, warping or deforming. Typically, the horizontal and vertical distances $X_{214}$ and $Y_{214}$ of elongated holes 219 and holes 19 of splice plate 214 are substantially similar or identical to horizontal and vertical distances $X_{14}$ and $Y_{14}$ of holes 19 of splice plate 14.

Thus, there has been shown and described a novel cable tray system including a splice plate, which overcomes many of the problems of the prior art. It will be apparent, however, to those familiar in the art, that many changes, variations, modifications, and other uses and applications for the subject devices and methods are possible. All such changes, variations, modifications, and other uses and applications that do not depart from the spirit and scope of the disclosure are deemed to be covered by the disclosure which is limited only by the claims which follow.

What is claimed is:

1. A splice plate for joining side rails of cable trays comprising:
   a vertical web extending a length, L, and having an upper edge and a lower edge, the vertical web comprising a protruded vertical web portion protruding from the vertical web in a first direction substantially perpendicular to the length of the vertical web, wherein the protruded vertical web portion is connected to and located between an upper vertical web portion and a lower vertical web portion;
   an upper flange extending from the upper edge of the vertical web and a lower flange extending from the lower edge of the vertical web, wherein the upper and lower flanges extend in a second direction substantially opposite from the first direction; and
   a population of holes extending through the vertical web through which a population of fasteners may be inserted to secure the splice plate to a side rail of a cable tray, wherein the population of holes extend through one or more of the upper vertical web portion and the lower vertical web portion.

2. The splice plate of claim 1 wherein the upper and lower flanges flare upward and downward, respectively, at an angle Θ.

3. The splice plate of claim 2 wherein the angle Θ is from about 90 degrees to about 105 degrees.

4. The splice plate of claim 1 wherein the length, L, is about 6 inches.

5. The splice plate of claim 1 wherein the length, L, is about 12 inches.

6. The splice plate of claim 1 wherein the population of holes comprises two holes extending through the upper vertical web portion and two holes extending through the lower vertical web portion.

7. The splice plate of claim 1 wherein one or more of the population of holes comprise elongated holes elongated in a direction parallel to the length, L, of the vertical web.

8. A cable tray system comprising:
   (A) a population of cable trays, each of the population of cable trays comprising a first side rail and a second side rail arranged substantially parallel to one another and a population of transverse rungs extending between and connecting the first and second side rails, wherein the first and second side rails comprise:
      (i) a side rail vertical web extending a length from a first end to a second end, the side rail vertical web having an upper edge and a lower edge, and a side rail protruded vertical web portion protruding from the side rail vertical web in a first direction substantially perpendicular to the length of the side rail vertical web; and
      (ii) a population of holes extending through the side rail, wherein one or more of the population of holes are located proximate the first and second ends of the side rail; and
   (B) a population of splice plates for joining the population of cable trays, the population of splice plates comprising:
      (i) a splice plate vertical web extending a length, L, and having an upper edge and a lower edge, and a splice plate protruded vertical web portion protruding from the splice plate vertical web in the first direction and wherein the splice plate protruded vertical web portion is adapted to cooperate with the side rail protruded vertical web portion;
      (ii) an upper flange extending from the upper edge of the splice plate vertical web and a lower flange extending from the lower edge of the splice plate vertical web, wherein the upper and lower flanges extend in a second direction substantially opposite from the first direction; and
      (iii) a population of holes extending through the splice plate which are adapted to be aligned with the population of holes extending through the side rail vertical web, wherein a population of fasteners may be inserted through the population of holes in the splice plate and the side rail to secure the splice plate to the side rails of a population of cable trays.

9. The cable tray system of claim 8 wherein the first and second side rails further comprise upper and lower horizontal flanges extending laterally in opposite directions from the upper and lower edges of the side rail vertical web portion.

10. The cable tray system of claim 9 wherein the upper horizontal flange further comprises an outboard upper flange portion having a downwardly extending lip located on a terminal edge of the outboard upper flange portion and wherein the lower horizontal flange further comprises an outboard lower flange portion having an upwardly extending lip located on a terminal edge of the outboard lower flange portion.

11. The cable tray system of claim 10 wherein the downwardly extending and the upwardly extending lips are adapted to retain upper and lower flanges of the splice plate.

12. The cable tray system of claim 8 wherein the side rail protruded vertical web portion is connected to and located between a side rail upper vertical web portion and a side rail lower vertical web portion.

13. The cable tray system of claim 12 wherein the height of the side rail lower vertical web portion is substantially equal to the height of the transverse rungs.

* * * * *